United States Patent Office.

C. C. PARSONS, OF NEW YORK, N. Y.

Letters Patent No. 96,721, dated November 9, 1869; antedated October 27, 1869.

IMPROVED PROCESS FOR PURIFYING PYROLIGNEOUS AND ACETIC ACIDS.

The Schedule referred to in these Letters Patent and making part of the same.

*To all whom it may concern:*

Be it known that I, C. C. PARSONS, of New York, in the county and State of New York, have invented a new and improved Process for Purifying Pyroligneous and Acetic Acids; and I do hereby declare that following is a full and exact description of the same, sufficient to enable others skilled in the art to practise it.

The invention consists in passing the vapors of either pyroligneous or acetic acid through a finely-divided substance, kept wet with suitable purifying-solutions.

Various attempts have been made to purify pyroligneous and acetic acids by different chemical substances, but as they have been heretofore applied, they have all proved to be either expensive or inefficient.

I attach to the top of the still, or place in any other convenient position between the still and the condenser, a vessel filled with some neutral body, in pieces about as large an ordinary bullet. If the body is porous it assists in the distribution of the purifying-solution.

I use pumice-stone, but there are several other substances which can be substituted therefor.

I cause a stream of the purifying-solution to flow upon the top of this neutral substance, so that it will saturate the whole of the said substance.

The vapor is thus finely divided by passing through the interstices among the pieces of the neutral body, and thoroughly exposed to the action of the purifying-solution.

The amount of the purifying-solution, and also its strength, may be graduated according to the impurity of the acid, or to the extent of the purifying-action desired.

I prefer to use about two feet in depth of the neutral body.

Different classes of purifying-substances can be used, according to the effect desired to be produced, either separating or conjointly.

When there is much tar, as in crude pyroligneous acid, I prefer sulphuric or other strong acid.

When the acid is somewhat purified, I prefer a solution of bichromate of potash, permanganate of potash, or some similar oxidizing body.

When it is desired to free the acid simply from some stronger acid, as sulphuric or muriatic, I prefer an alkaline solution, such as caustic soda or potash, or solution of acetate of soda, acetate of lime, or acetate of potash.

Many other chemical substances, having a purifying influence on pyroligneous and acetic acids, can be used and applied, as herein described, but being well known to those engaged in the business, it is not necessary here to enumerate them.

In practice, I have often found considerable advantage in combining this process with that patented by me on February 23, 1869, No. 87,193.

According to the character of the acid to be purified, its vapors may be passed through carboniferous material, as described in the above patent, either before or after exposing them to the action of the purifying-solution, as described herein, or it may be useful to pass the vapors through carboniferous material both before and after they are exposed to the purifying-solution.

It is also sometimes advantageous to mix some stronger acid with the pyroligneous or acetic acid before distillation, especially when it is intended to use an oxidizing-solution, as the presence of the stronger acid increases the oxidizing-action, and also by combining with the base, prevents the acetic or pyroligneous acid from so doing, and thereby being wasted.

It will be seen that in this way I get the most perfect and thorough exposure of the acid vapors to the chemical action of the solutions, and at the same time employ the least possible amount of the purifying-material, thus saving both the purifying-substance and the acetic or pyroligneous acids.

I do not claim the general use of any purifying-substances, but limit my claim to their use in solution, in connection with a finely-divided neutral body, for the purpose and in the manner described.

What I claim as my invention, and desire to secure by Letters Patent, is—

1. Purifying the vapors of either acetic or pyroligneous acid, by passing them through a mass composed of small pieces of some suitable neutral substance kept wet with suitable purifying-solutions, substantially in the manner and for the purpose as herein described.

2. Using the above-described process in combination with that invented and patented by me on February 23, 1869, No. 87,193.

C. C. PARSONS.

Witnesses:
WM. J. PARSONS,
WM. S. SQUIER.